(12) United States Patent
Hohimer et al.

(10) Patent No.: US 11,428,437 B2
(45) Date of Patent: Aug. 30, 2022

(54) INSTANT-RESPONSE ON-DEMAND WATER HEATER

(71) Applicant: BUNN-O-MATIC CORPORATION, Springfield, IL (US)

(72) Inventors: Matthew Hohimer, Springfield, IL (US); Chen-I Huang, Springfield, IL (US); Wee Ng, Chatham, IL (US); Colin Joseph Weisenfeld, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 578 days.

(21) Appl. No.: 16/478,184

(22) PCT Filed: Jan. 19, 2018

(86) PCT No.: PCT/US2018/014335
§ 371 (c)(1),
(2) Date: Jul. 16, 2019

(87) PCT Pub. No.: WO2018/136689
PCT Pub. Date: Jul. 26, 2018

(65) Prior Publication Data
US 2019/0368776 A1    Dec. 5, 2019

Related U.S. Application Data

(60) Provisional application No. 62/448,842, filed on Jan. 20, 2017.

(51) Int. Cl.
*F24H 1/10* (2022.01)
*A47J 31/54* (2006.01)
(Continued)

(52) U.S. Cl.
CPC .......... *F24H 1/105* (2013.01); *A47J 31/4428* (2013.01); *A47J 31/461* (2018.08);
(Continued)

(58) Field of Classification Search
CPC .......... F24H 1/101; F24H 1/122; F24H 1/142; A47J 31/54; A47J 31/542; A47J 31/545; A47J 31/4428
(Continued)

(56) References Cited

U.S. PATENT DOCUMENTS

| 4,224,503 A | 9/1980 | Gijzel et al. |
| 4,531,047 A | 7/1985 | Canfield et al. |

(Continued)

FOREIGN PATENT DOCUMENTS

| CN | 101756638 | 6/2010 |
| CN | 204460748 U | 7/2015 |
| CN | 205053786 U | 3/2016 |

OTHER PUBLICATIONS

Search Report & Written Opinion issued in Int'l App. No. PCT/US2018/014335 (dated 2018).

*Primary Examiner* — Reginald Alexander
(74) *Attorney, Agent, or Firm* — Barnes & Thornburg LLP (57) ABSTRACT

An on-demand hot water dispenser includes a housing, a water heating system received in the housing, and a faucet connected to the water heating system through the housing for dispensing hot water into a container. A drip tray is positioned below the faucet and a screen covers the drip tray to support the container during dispensing of the hot water.

20 Claims, 5 Drawing Sheets

(51) Int. Cl.
   *A47J 31/46*  (2006.01)
   *A47J 31/44*  (2006.01)
   *F24H 9/20*   (2022.01)
   *F24H 1/12*   (2022.01)
   *F24H 1/14*   (2022.01)

(52) U.S. Cl.
   CPC ............ *A47J 31/468* (2018.08); *A47J 31/54* (2013.01); *A47J 31/542* (2013.01); *F24H 1/101* (2013.01); *F24H 1/122* (2013.01); *F24H 9/2028* (2013.01); *A47J 31/545* (2013.01); *F24H 1/142* (2013.01)

(58) Field of Classification Search
   USPC .................................... 99/307, 302 R
   See application file for complete search history.

(56) References Cited

U.S. PATENT DOCUMENTS

| | | |
|---|---|---|
| 4,889,974 A | 12/1989 | Auding et al. |
| 5,233,970 A | 8/1993 | Harris |
| 5,271,086 A | 12/1993 | Kamiyama et al. |
| 5,371,830 A | 12/1994 | Wachenheim |
| 6,376,816 B2 | 4/2002 | Cooper |
| 6,459,854 B1 | 10/2002 | Yoakim et al. |
| 6,868,230 B2 | 3/2005 | Gerhardinger |
| 7,003,220 B2 | 2/2006 | Gerhardinger |
| 7,401,545 B2 | 7/2008 | Hu et al. |
| 7,421,194 B2 | 9/2008 | Lin |
| 7,486,877 B2 | 2/2009 | Boussemart et al. |
| 8,600,223 B2 | 12/2013 | Etter et al. |
| 8,744,252 B1 | 6/2014 | Snyder et al. |
| 8,787,742 B2 | 7/2014 | Lutz et al. |
| 11,083,329 B2 * | 8/2021 | Kelly ............... F24H 1/101 |
| 2002/0074350 A1 | 6/2002 | Jones et al. |
| 2007/0272085 A1 * | 11/2007 | Ghassemlou ......... A47J 31/545 |
| | | 99/281 |
| 2010/0232772 A1 * | 9/2010 | Chiu ................... A47J 31/542 |
| | | 392/441 |
| 2011/0008030 A1 | 1/2011 | Luo et al. |
| 2015/0345826 A1 * | 12/2015 | Lutz, II ............... H05B 1/0297 |
| | | 392/486 |

* cited by examiner

INSTANT-RESPONSE ON-DEMAND WATER HEATER

CROSS REFERENCE TO RELATED APPLICATIONS

This application is a U.S. nationalization under 35 U.S.C. § 371 of International Application No. PCT/US2018/014335, filed Jan. 19, 2018, which claims benefit under 35 U.S.C. § 119 of U.S. Provisional Patent Application No. 62/448,842, filed Jan. 20, 2017. The disclosures set forth in the referenced applications are incorporated herein by reference in their entireties.

BACKGROUND

A variety of water heating devices have been developed to provide on-demand heated water within desired temperature ranges. However, these on-demand heating systems often require time to warm up the water before the flow is at the desired temperature, include large volumes of water requiring constant heating, and are subject to depletion requiring an extended period of time before hot water is available again.

This background information is merely provided for context, and no admission is intended, nor should such admission be inferred or construed, that any of the preceding information constitutes prior art to the present disclosure.

SUMMARY

According to the present disclosure, an on-demand hot water dispenser includes a housing, a water heating system received in the housing, and a faucet connected to the water heating system through the housing for dispensing hot water into a container. A drip tray is positioned below the faucet and a screen covers the drip tray to support the container during dispensing of the hot water.

In illustrative embodiments, the water heating system includes a water delivery and recovery system and an instant-response heater assembly. Water is supplied through the water delivery and recovery system to the instant-response heater assembly for heating. The heated water passes to the faucet for dispensing.

In illustrative embodiments, the instant-response heater assembly includes a lower manifold, an array of heater tubes coupled to the lower manifold at a first end, and an upper manifold coupled to an opposite second end of the array of heater tubes. The lower manifold divides a supply of water for distribution to individual heater tubes of the array of heater tubes. The water is heated in the array of heater tubes and passes into the upper manifold. The faucet is coupled to the upper manifold for dispensing of hot water from the upper manifold.

In illustrative embodiments, each heater tube of the array of heater tubes is a metal-coated quartz heater tube. Each heater tube is coupled to the lower and upper manifolds by flexible connectors to allow expansion and contraction of the heater tubes. A controller of the hot water dispenser controls operation of each heater tube individually. Temperature sensors coupled to the heater tubes provide feedback to the controller.

In illustrative embodiments, the upper manifold includes a mixing chamber and a hot water reservoir coupled to the mixing chamber. The mixing chamber is arranged horizontally and the reservoir is arranged vertically to extend at least partially below the mixing chamber. Water from the array of heater tubes passes into the mixing chamber and flows to the reservoir. The faucet is coupled to the reservoir which provides a buffer to the pressures and turbulence of the water in the mixing chamber. The reservoir stores a volume of hot water for immediate dispensing through the faucet. The reservoir is heated to maintain the water at a desired predetermined temperature.

In illustrative embodiments, the water delivery and recovery system includes an equalization chamber and a pump coupled to the equalization chamber. Water is controllably delivered to the equalization chamber and the pump pulls water from the equalization chamber for delivery to the lower manifold of the instant-response heater assembly. A vent line is coupled to the upper manifold of the instant-response heater assembly and the equalization chamber for venting of the upper manifold. An overflow line is coupled to the equalization chamber to pass excess water to the drip tray.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figures 1, 2:
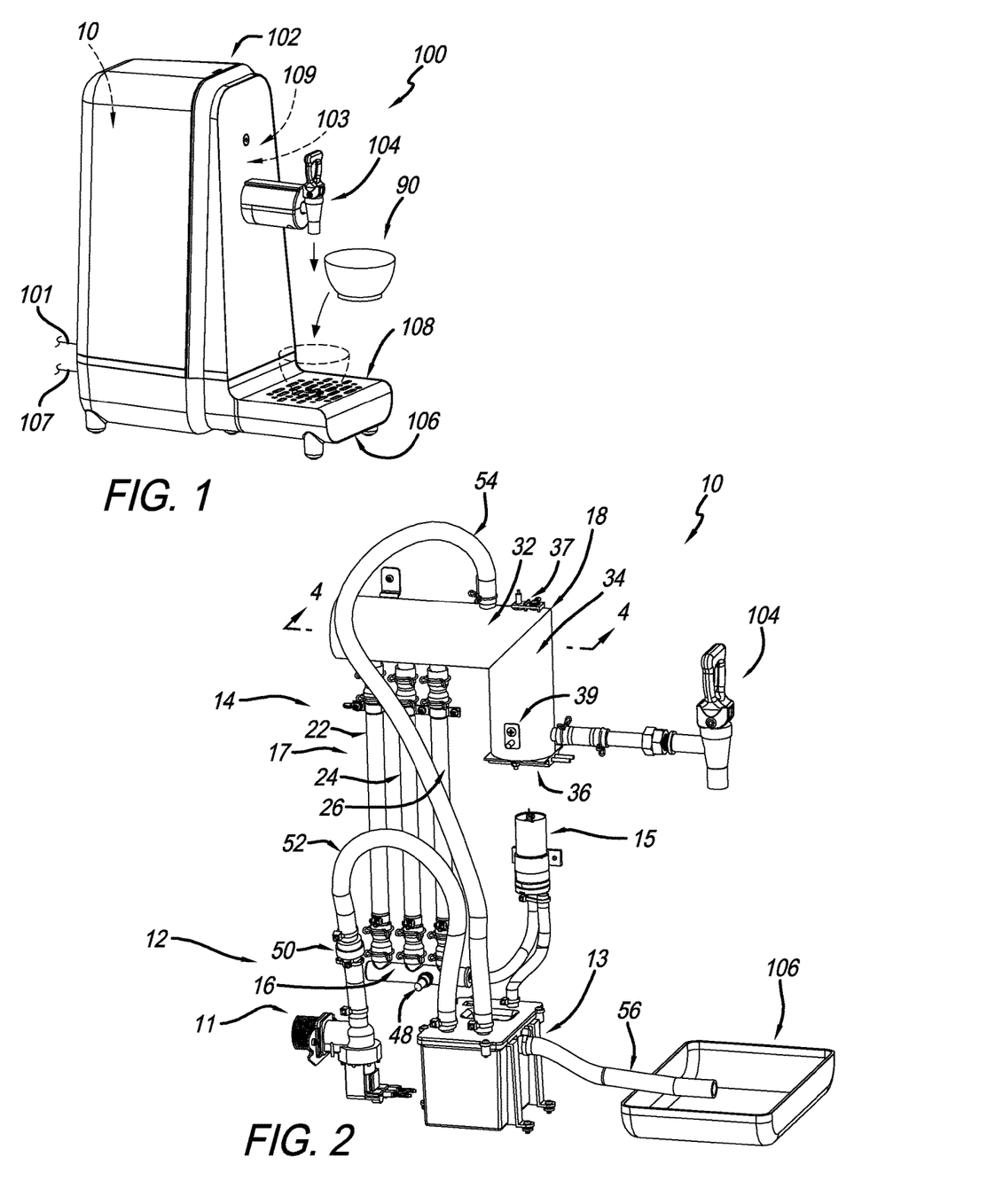
FIG. 1 is a perspective view of an on-demand hot water dispenser in accordance with the present disclosure showing that the dispenser includes a housing, a water heating system received in the housing, and a faucet connected to the water heating system through the housing for dispensing hot water into a container.
FIG. 2 is a perspective view of the water heating system of the hot water dispenser of FIG. 1 showing that the water heating system includes a water delivery and recovery system and an instant-response heater assembly and suggesting that water is supplied through the water delivery and recovery system to the instant-response heater assembly for heating and dispensing through the faucet.

An on-demand hot water dispenser 100 in accordance with the present disclosure is shown in FIG. 1. Dispenser 100 includes a housing 102, a water heating system 10 received in housing 102, and a faucet 104 connected to water heating system 10 through housing 102 for dispensing hot water into a container 90. A drip tray 106 is positioned below faucet 104 and a screen 108 covers drip tray 106 to support container 90 during dispensing of the hot water. An internal frame 109 supports the components of dispenser 100 relative to housing 102. A controller 103 controls operation of dispenser 100 to provide water at a desired predetermined temperature, such as within a range of about 90 C.° to about 96 C.° (about 195 F.° to about 205 F.° for example. Dispenser 100 is connected to a power supply line 101 and water supply line 107 for providing power and water, respectively, to dispenser 100.

Figure 3:
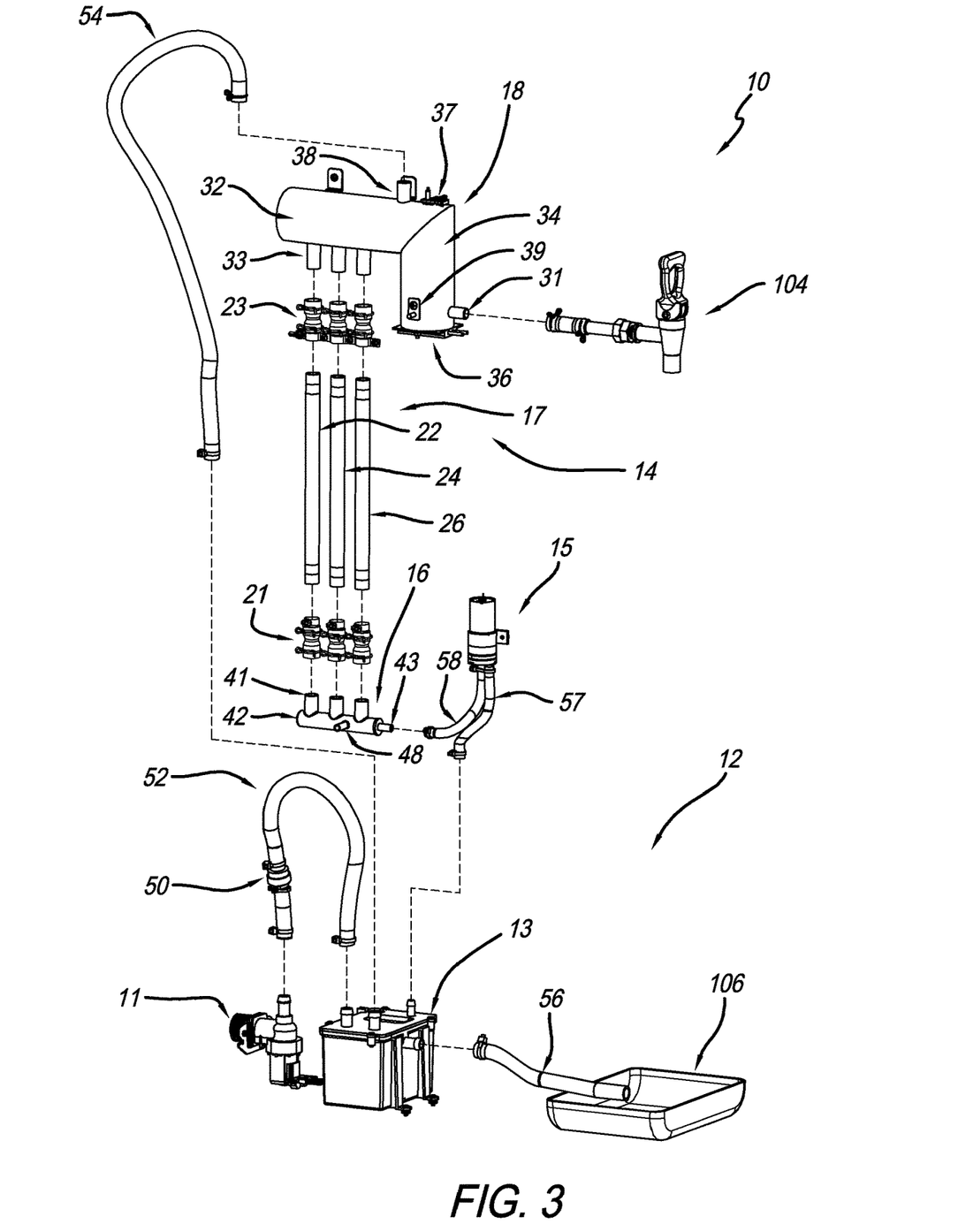
FIG. 3 is an exploded assembly view of the water heating system of FIG. 2 showing that the instant-response heater assembly includes a lower manifold, an array of heater tubes coupled to the lower manifold at a first end, and an upper manifold coupled to an opposite second end of the array of heater tubes and that the water delivery and recovery system includes an equalization chamber and a pump coupled to the equalization chamber and to the lower manifold for supplying water to the instant-response heater.

One embodiment of a water heating system 10 in accordance with the present disclosure is shown in FIGS. 2 and 3. Water heating system 10 includes a water delivery and recovery system 12 and an instant-response heater assembly 14. Water is supplied through water delivery and recovery system 12 to instant-response heater assembly 14 for heating and dispensing through faucet 104. Instant-response heater assembly 14 stores a limited volume of hot water that is maintained at a desired predetermined temperature for immediate dispensing, and water heating system 10 is able to generate additional heated water for dispensing prior to the volume of stored hot water being depleted. Water heating system 10 is also able to provide a continuous flow of heated water at the desired predetermined temperature.

Water delivery and recovery system 12 includes an equalization chamber 13 and a pump 15 coupled to the equalization chamber 13 as shown in FIGS. 2 and 3. Water is controllably delivered to equalization chamber 13 through an inlet valve 11, such as a solenoid valve, over an entry line 52. In the illustrative embodiment, a check valve 50 is coupled to entry line 52 to block a back-flow of water toward inlet valve 11. Pump 15 pulls water from equalization chamber 13 for delivery to instant-response heater assembly 14. In some embodiments, pump 15 is a diaphragm pump.

Instant-response heater assembly 14 includes a lower manifold 16, an array of heater tubes 17 coupled to lower manifold 16 at a first end, and an upper manifold 18 coupled to an opposite second end of array 17 as shown in FIGS. 2 and 3. In the illustrative embodiment, array 17 includes three heater tubes 22, 24, 26. In some embodiments, array 17 can include more or less than three heater tubes. Each heater tube 22, 24, 26 controllably heats water running through heater tubes 22, 24, 26. In some embodiments, heater tubes 22, 24, 26 are formed from a resistive material that is controllably energized to produce heat. In some embodiments, heater tubes 22, 24, 26 are metal-coated quartz heater tubes. Array 17 is configured to heat to an operating temperature in a limited amount of time (such as less than 2 seconds) once activated, and to provide a sufficient amount of heat so that water heating system can provide a continuous supply of heater water for dispensing. In some embodiments, array 17 can reach an operating temperature in less than 1.5 seconds. In some embodiments, array 17 can reach an operating temperature in less than about 1.25 seconds.

Figure 4:
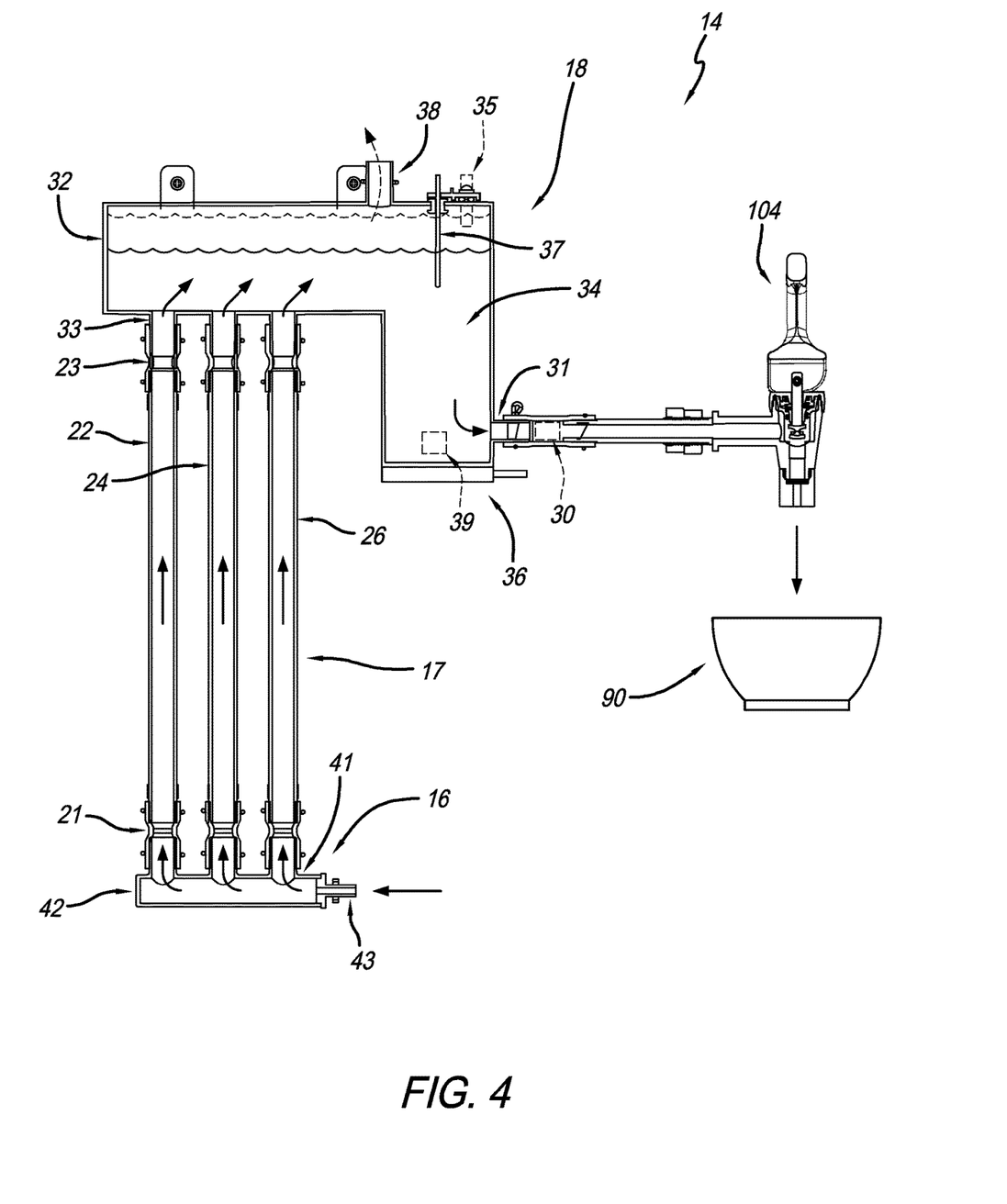
FIG. 4 is a sectional view taken along line 4-4 in FIG. 2 showing that the upper manifold includes a mixing chamber and a reservoir and suggesting that lower manifold divides a supply of water for distribution to individual heater tubes of the array of heater tubes and that the water is heated in the array of heater tubes and passes into the mixing chamber of the upper manifold to fill the reservoir for dispensing of hot water through the faucet.

Lower manifold 16 divides a supply of water for distribution to individual heater tubes 22, 24, 26 of array 17 as suggested in FIG. 4. The smaller portions of water are heated in the heater tubes 22, 24, 26 and pass into upper manifold 18. The heated water collects and mixes in upper manifold to provide a consistent and uniform temperature of the water. Faucet 104 is coupled to upper manifold 18 for dispensing of the heated water. In some embodiments, a heater is coupled to lower manifold 16 to maintain the water in lower manifold 16 and array 17 above a predetermined temperature. In some embodiments, array 17 is periodically activated to maintain the water in array 17 above a predetermined temperature.

A vent line 54 is coupled to upper manifold 18 and equalization chamber 13 for venting of steam and expanding water from upper manifold 18 as suggested in FIGS. 2 and 3. An overflow line 56 is coupled to equalization chamber 13 to pass excess water to drip tray 106 for evaporation or to be discarded by a user of dispenser 100. Overflow line 56 also allows steam, air, and other gasses to pass out of water heating system 10 to minimize or eliminate pressures that can build up in instant response heater assembly 14. A drain port 48 of lower manifold 16 allows water to be drained from instant-response heater assembly 14 for maintenance and cleaning.

Lower manifold 16 includes a plenum tube 42, and inlet port 43 coupled to an end of plenum tube 42, and outlet ports 41 extending upward from plenum tube 42 and distributed along a length thereof as shown in FIG. 3. Pump 15 is coupled to equalization chamber 13 by a line 57 and coupled to inlet port 43 of lower manifold 16 by a line 58. In some embodiments, a check valve 59 (not shown in FIG. 3, but shown in FIG. 7) is coupled to line 57 in addition or alternatively to check valve 50. In the illustrative embodiment, the number of outlet ports 41 matches the number of heater tubes 22, 24, 26 in array 17. Heater tubes 22, 24, 26 are coupled to outlet ports 41 by flexible connectors 21 to allow expansion and contraction of heater tubes 22, 24, 26 and other lateral movements relative to lower manifold 16.

Upper manifold 18 includes a mixing chamber 32 and a hot water reservoir 34 coupled to the mixing chamber 32 as shown in FIGS. 3 and 4. In the illustrative embodiment, mixing chamber 32 is arranged horizontally and reservoir 34 is arranged vertically to extend at least partially below mixing chamber 32. Inlet ports 33 are coupled to mixing chamber 32 and distributed along a length thereof. Heater tubes 22, 24, 26 are coupled to inlet ports 33 by flexible connectors 23 to allow expansion and contraction of heater tubes 22, 24, 26 and other lateral movements relative to upper manifold 18.

Heated water exiting array 17 passes into mixing chamber 32 of upper manifold 18 and combines together as suggested in FIG. 4. The combined supply of heated water flows to reservoir 34 for delivery to faucet 104 through an outlet port 31. Reservoir 34 provides a buffer to the pressures and turbulence of the water in mixing chamber 32. Reservoir 34 also stores a limited volume of hot water for immediate dispensing through faucet 104 after an idle period. A heater 36 is coupled to reservoir 34 to maintain the water in reservoir 34 at a desired predetermined temperature. A temperature sensor 39 monitors a temperature of the water in reservoir 34 and provides feedback to controller 103. In some embodiments, a heater is coupled to mixing chamber 32 in addition or alternative to heater 36.

A depth gauge 37 is coupled to upper manifold 18 to monitor a level of water in instant-response heater assembly 14 as suggested in FIG. 4. The level of water is maintained above inlet ports 33 to ensure that heater tubes 22, 24, 26 are not operated in an empty condition. Heating of the water can cause expansion and filling of upper manifold 18 as suggested by the level of water shown in phantom in FIG. 4. A vent port 38 is coupled to upper manifold 18 and allows steam and expanding heated water to pass through vent line 54 to equalization chamber 13 as suggested in FIG. 3. The addition of water into equalization chamber 13 can cause a level of water inside equalization chamber 13 to rise above a threshold, and excess water is passed through overflow line 56 into drip tray 106.

Controller 103 operates water heating system 10 to maintain a volume of heated water in upper manifold 18 above a minimum threshold level indicated by depth gauge 37 as suggested in FIG. 4. In some embodiments, controller 103 provides a signal to an operator of dispenser 100 if the water level in upper manifold 18 falls below this minimum level and blocks operation of dispenser 100. In some embodiments, controller 103 operates pump 15 to supply water through array 17 into upper manifold 18 without energizing heater tubes 22, 24, 26 until upper manifold 18 is filled to at least the minimum level. The volume of hot water stored in reservoir 34 allows an initial flow of hot water to be dispensed while giving time for heater tubes 22, 24, 26 to fully energize for forming additional heated water such that a user does not experience a delay in receiving hot water and can continuously dispense additional hot water if desired.

In some embodiments, a flow sensor 30 (such as a reed switch) is coupled to faucet 104 to indicate to controller 103 when water is flowing through faucet 104 so that additional heated water can be produced by operating water heating system 10 as suggested in FIG. 4. In some embodiments, a second depth gauge 35 is coupled to upper manifold 18 and indicates a predetermined level of hot water to be maintained in upper manifold 18. For example, dispensing of hot water through faucet 104 can lower the level of water in upper manifold 18 below sensor 35, and controller 103 responds by operating water heating system 10 to refill upper manifold 18 with heated water to the predetermined level.

Figure 5:
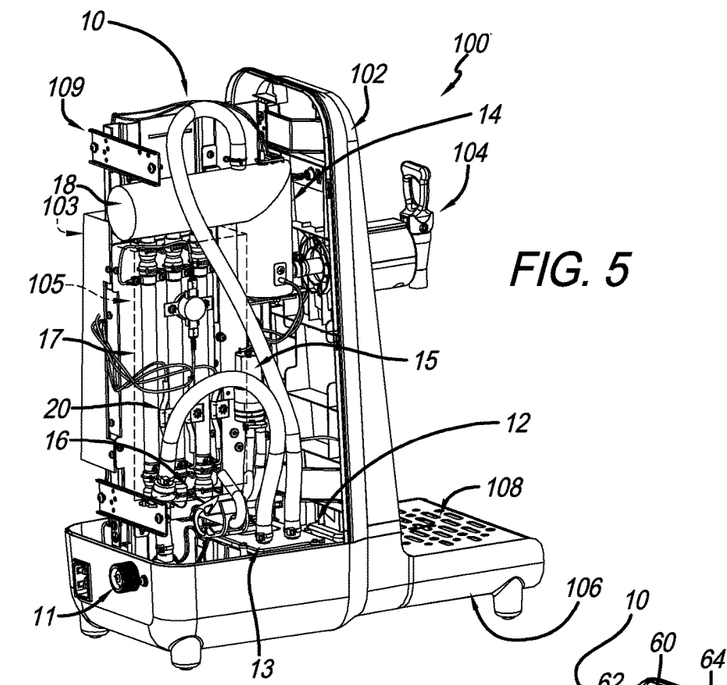
FIG. 5 is rear perspective view of the hot water dispenser of FIG. 1 with a portion of the housing removed to show an arrangement of the water heating system relative to the housing in accordance with the present disclosure.
Figure 6:
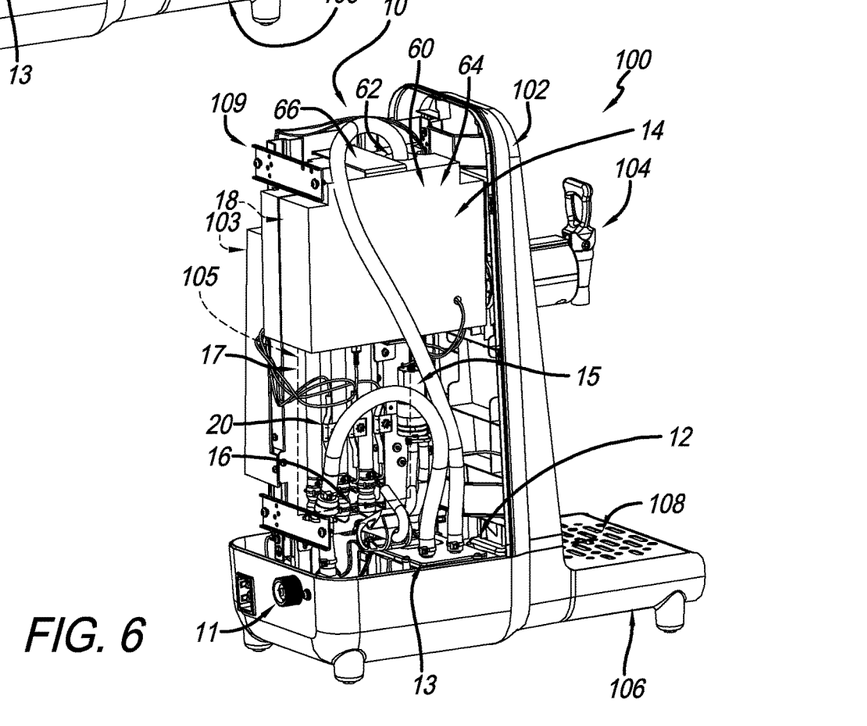
FIG. 6 is a view similar to FIG. 5 showing an insulative cover coupled around the upper manifold to reduce power used to maintain water in the reservoir at a desired predetermined temperature.

In one illustrative embodiment, water heating system 10 is coupled to frame 109 and positioned relative to housing 102 as shown in FIG. 5. In some embodiments, a protective cover 105 (shown in phantom in FIG. 5) surrounds array 17. In some embodiments, an array of TCOs 20 (such as fuses and/or resettable thermostats) is coupled to heater tubes 22, 24, 26 to sense a temperature of each heater tube 22, 24, 26 and are configured to cut off power to heater tubes 22, 24, 26 if the sensed temperature is above a threshold level, such as if the heater tubes 22, 24, 26 are operating in a dry condition. In some embodiments, an insulative cover 60 surrounds upper manifold 18 as shown in FIG. 6. Insulative cover 60 includes two halves 62, 64 held together by a bracket 66. In some embodiments, insulative cover 60 surrounds a portion of heater tubes 22, 24, 26. In some embodiments, insulative cover 60 is formed as outer shell halves lined with a ceramic based insulation material and secured together with fasteners around upper manifold 18.

Figure 7:
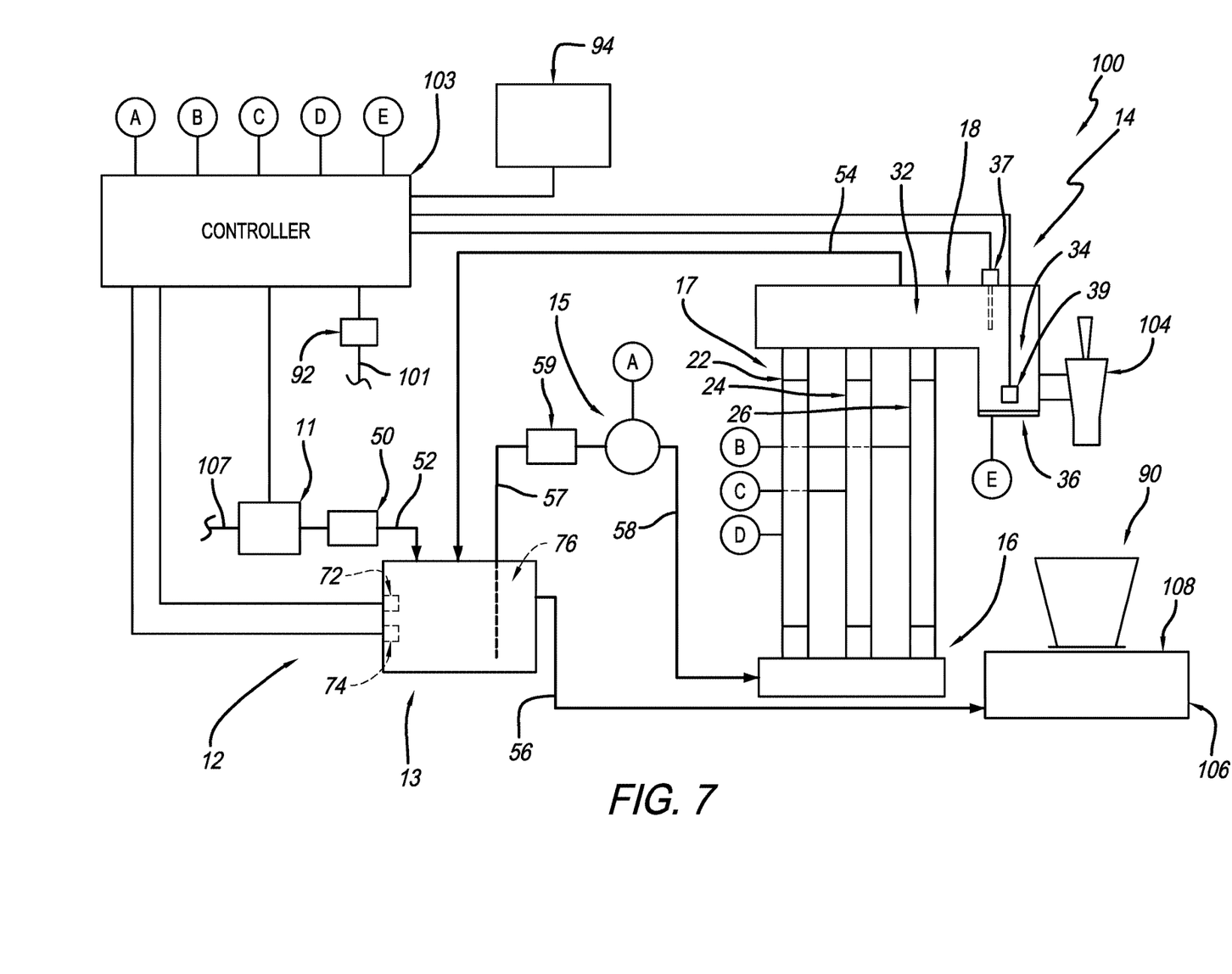
FIG. 7 is a diagrammatic view of the on-demand hot water dispenser of FIG. 1 showing that a controller is coupled to the water delivery and recover system and water heating system to control operation of the dispenser and suggesting that sensors provide feedback to the controller to provide a continuous flow of water for dispensing at a desired predetermined temperature.

A diagrammatic view of on-demand hot water dispenser 100 is shown in FIG. 7. In the illustrative embodiment, a power switch 92 controls delivery of electrical power from power supply line 101 to controller 103. In some embodiments, a user interface 94 is coupled to controller 103 and allows a user to set a predetermined temperature of the water dispensed by hot water dispenser 100. In some embodiments, the predetermined temperature is hard set by the manufacturer of dispenser 100. In some embodiments, the predetermined temperature is selected in a range of about 70 C.° to about 98 C.°. In some embodiments, the predetermined temperature is selected in a range of about 90 C.° to about 96 C.°. In some embodiments, the heated water is maintained and dispensed within about 1 C.° from the set predetermined temperature.

Pump 15 and array 17 are operated by controller 103 to provide heated water for dispense into container 90 at the selected predetermined temperature as suggested in FIG. 7. A temperature sensor 74 coupled to equalization chamber 13 provides feedback to controller 103 so that a temperature of water being provided to array 17 can be accommodated. A level sensor 72 provides feedback to controller 103 so that a level of water is maintained in equalization chamber 13 using inlet valve 11. In the illustrative embodiment, a funnel 76 is coupled to line 57 to allow water to be drawn into pump 15 from a lower portion of equalization chamber 13 to account for variations in the level of water in equalization chamber 13.

Temperature sensors 39, 74 coupled to controller 103 help provide temperature feedback information so that the temperature of the hot water being dispensed can be maintained within a consistent narrow range. The ability of heater tubes 22, 24, 26 to rapidly heat and cool allows for precise temperature control of the water flowing through water heating system 10.

In some embodiments, water heating system 10 is incorporated into another device that uses hot water supplied by water heating system 10, such as a coffee or tea brewer, a home or commercial appliance, a sanitizer, or other device.

In illustrative embodiments, with reference to FIGS. 1-3, an on-demand hot water dispenser 100 provides heated water, on-demand within a relatively narrow temperature range, in a controllable manner, with water at the initiation of the dispense within a predetermined temperature range. Dispenser 100 is controllable to set different temperatures for various water temperature requirements.

In illustrative embodiments, the diagrammatic illustration of FIG. 7 shows an inlet water line 107 coupled to an inlet solenoid valve 11. The inlet solenoid valve 11 is a 12 VDC, 8 VA controllable valve, controllable by controller 103. Water entering dispenser 100 flows into an equalization chamber 13. A pump 15 is used to move water from the equalization chamber 13 to a heater assembly 14. The pump 15 is a 12 VDC, 800 mA controllable pump meeting the necessary sanitation standards for such a system and communicating with the controller 103. In some embodiments, the pump 15 is a controllable diaphragm pump to more precisely control the flow by varying the input voltage to the pump 15 which is useful for consistently managing variable and changing incoming water temperatures. This control also allows the controller to delay operation of the pump in the event the incoming water temperature is cooler and requires more energy in the heater tubes. A check valve 59 is positioned between the pump 15 and equalization chamber 13 to prevent backflow from the heater array 17 to the equalization chamber 13.

In illustrative embodiments, the controller 103 can energize heater tubes 22, 24, 26 of the heater assembly 14 for a brief but significant 1.25-1.5 seconds which is just enough time for the energy transfer from the heating element tube wall to the water in the tube and to have sufficient heating to compensate for the cooler incoming water. The cooler incoming water has a greater heat transfer capacity and can absorb the added energy provided by the tubes 22, 24, 26.

In illustrative embodiments, an array 17 of the heater assembly 14 includes a series of parallel, generally vertically oriented quartz heater tubes 22, 24, 26 coupled to and communicating with the pump 15 by way of a first or lower manifold 16. A water line 58 feeds water to the lower manifold 16 which then provides water to each of the vertically oriented quartz heater tubes 22, 24, 26. Water heated in the quartz heaters passes into a second or upper manifold 18 which communicates with a dispensing nozzle or faucet 104. A container 90 can be positioned above a drip tray 106 for receiving heated water from the faucet 104.

In illustrative embodiments, the water entering the heater assembly 14 is heated by the heater tubes 22, 24, 26. As described, the heater tubes 22, 24, 26 can be quartz-type heaters having a wall defining a passage through which water flows. The quartz heaters are aligned in parallel to increase the transfer of energy from the heater to the water flowing through the passage within the heater. In other words, water is distributed by the lower manifold 16 through each of the three heater tubes 22, 24, 26 which then feed the heated water to the upper manifold 18. A mixing chamber 32 of the upper manifold 18 collects the water from the quartz heaters that flows into a reservoir 34 of upper manifold 18.

In illustrative embodiments, the mixing chamber 32 of the upper manifold 18 is generally horizontally aligned so as to receive the water from the heater tubes 22, 24, 26 and allow for some initial mixing as the water from the heater tubes 22, 24, 26 flows towards the reservoir 34. This preliminary mixing helps to provide temperature equalization and consistency of the water temperature throughout the entire volume of water to prevent inconsistent temperature from dispense to dispense, especially if the dispensed volume is relatively small. The water flowing from the mixing chamber 32 flows into the generally vertically oriented reservoir 34 for additional mixing and then pooling or retention. This reservoir 34 is relatively small to provide an efficient volume to be heated or retained at temperature by a heating element 36. The structure of the upper manifold 18 including both the horizontal upper mixing chamber 32 and the vertical lower reservoir 34 is formed of a stainless steel material. Other materials may be used in other embodiments. In the present embodiment stainless steel has been found to be useful to help conduct heat throughout the entire volume to help maintain consistency. In this regard, a heating element 36 can transfer heat through convection to the volume of water in the upper manifold 18. Additionally, the transfer of heat through the stainless steel material also helps transfer heat for better distribution and consistency.

In illustrative embodiments, the dispenser 100 provides what is virtually instant hot water at a predetermined temperature as soon as the faucet 104 is opened. In this regard, the upper manifold 18 provides a generally optimal volume of water related to the flow rate of the water heating system 10 and the heat transfer capacity of the heater tubes 22, 24, 26 which are coordinated through the controller 103. The water heating system 10 maintains the upper manifold 18 in a generally full condition by use of one or more level sensing probes 37 to the controller 103. These level sensing probes provide feedback about the level of water in the manifold 18 and to increase the flow rate to the manifold 18 when probe 37 detects a low water condition or to the slow the flow of water to the manifold 18 when level probe 37 senses a relatively high lever water condition. These level probes help assure that there is a consistent volume of buffer water in the manifold 18 to provide a predetermined volume of water for instantaneous dispensing. While level probes are shown, any other form of currently available detector or such detectors hereafter developed may be substituted to provide a substantially similar function for a substantially similar result.

In illustrative embodiments, The volume used for the upper manifold 18 allows for some dispensing of water while the heater tubes 22, 24, 26 are energized and the pump 15 is controllably energized to the appropriate rate. The flow rate through the faucet 104 is calculated to allow for some dispensing from the upper manifold 18 while additional heated water is produced to replenish water which has been dispensed. As the dispensing occurs, some gap or space is produced within the mixing chamber 32 providing room for water to flow from the heater tubes 22, 24, 26 into the upper manifold 18. This space can be useful since the water flowing from the heater tubes 22, 24, 26 upwardly into the generally horizontal mixing chamber 32 tends to flow rather rapidly. This rapid flow helps assure thorough mixing and transfer to the reservoir 34. The one or more probes 37 are positioned forwardly in the mixing chamber 32 away from the ports 33 so as to be generally independent of potential turbulence flow in the rear of the mixing chamber 32 and helps increase the accuracy of the readings of the probe 37.

In illustrative embodiments, as the dispenser 100 operates, the user is provided with a generally consistent flow rate of generally unlimited consistent temperature water flowing from the dispenser 100. The dispenser 100 provides precisely heated water of a limited but selected flow rate to maintain consistent, at temperature flow without maintaining a large volume of heated water. The dispenser 100 is optimized for precision heating to reduce energy requirements and to reduce energy loss once it has been added to the water heating system 10.

In illustrative embodiments, the heater tubes 22, 24, 26 are quartz heater tubes which are tin coated glass. These are extremely efficient at transferring energy from the electrical source to the water contacting the internal surfaces of the tubes. Thermostats in an array 20 are provided on each of the heater tubes 22, 24, 26 to monitor the temperature of the heater tubes and helps prevent a runaway heating condition that could produce undesired conditions if the entire machine becomes heat saturated. If the TCO's detect an overheating condition they can terminate energy supplied to the heater tubes as a safety precaution. This will also turn off the machine and/or lock it out to prevent dispensing until the condition is cleared and/or the machine is reset.

In illustrative embodiments, an insulating structure 60 is provided to help retain energy introduced into the water in the system and preventing transfer away from the system. The insulating structure can surround all or a portion of the heater tubes. This insulating structure 60 provides insulation to retain heat within the flow path and to prevent the transfer of heat out of the flow path. While it is important to insulate and retain heat energy for efficiency and consistency, it is also important to prevent the out transfer of heat energy to the surrounding structures and components positioned inside the housing 102. Unwanted heat could be detrimental to the long term durability and reliability of various components. To this end, a resettable thermostat can be coupled to the controller 103 to detect temperature relative to the exterior of this insulating structure 60. This helps provide additional safety sensing of temperature. The present system balances the energy put into the heating of the water with the flow rate through the system. The dimensions of the quartz heater tubes, flow capacity, dimension of the inlet lines, mixing chamber volume, and other elements are sized and dimensioned to maintain a flow rate within a predetermined flow rate range. In the present embodiment a flow rate or dispense rate of approximately 500-650 cc/min is established. Higher or lower flow rates can be established upon adjusting the system to accommodate such a range.

In illustrative embodiments, the energy supplied to the heater tubes 22, 24, 26 can be controlled by the controller 103. Water flowing into the mixing chamber 32 and reservoir 34 is monitored by an NTC thermistor temperature sensor 39 coupled to the controller 103. Additional temperature sensors can be used to monitor the water in upper manifold 18. The temperature sensors coupled to the controller 103 (e.g., sensors 39, 74) help provide temperature feedback information to help maintain temperature within a desired temperature range. The ability of heater tubes 22, 24, 26 to rapidly heat and cool allows for precise temperature control of the water flowing through water heating system 10 so that hot water being dispensed is at a consistent temperature. In one form of this embodiment a desired temperature is within a range of about 90 C.° to about 96 C.° (about 195 F.° to about 205 F.°. Other temperature ranges can be established depending on the use of the water for tea, coffee, food mixing, etc. being dispensed from the dispenser 100.

In illustrative embodiments, the energy control of the present water heating system 10 draws limited power to maintain a small volume of water at the desired predetermined temperature which can be heated efficiently. Other devices provide a large holding tank which is constantly heated to provide the on-demand conditions of the heated water. The present embodiment eliminates such a tank and only draws the power needed to heat larger volumes of water with the quartz heater tubes 22, 24, 26 when water is continuously dispensed.

In illustrative embodiments, the upper manifold 18 provides a way to manage the flow or stabilize the flow after water is heated in the heater tubes 22, 24, 26 and before dispensing through the faucet 104. The reservoir 34 is heated with a controllable PTC heater or heating element 36. The PCT heater is configured as a 120/220-240 VDC controllable element coupled to the controller 103 and positioned relative to a lower portion of the reservoir 34. In addition or alternative to heater 36, the mixing chamber 32 is heated and includes a heating element wrapped around the mixing chamber 32. Additionally, insulation 60 is provided over this heating element so as to retain energy added to the water in the mixing chamber 32.

In illustrative embodiments, the area surrounding the upper manifold 18 includes a generally rigid insulating structure 60 which is retained in place by a retaining band 66. The structure 60 includes a first portion 62 and a second portion 64 to allow the structure 60 to be positioned and closed much like a clam shell around the upper manifold 18. The band 66 attaches at two ends and retains the portions 62, 64 of the structure 60 in position. The reduction of the energy consumption in both an operating and idle condition helps reduce the overall energy consumption of the dispenser 100. In an idle condition, energy transfer to the interior of the machine is reduced as noted herein. Additionally, less energy is needed to maintain the idle or stand-by condition. In a dispensing mode, energy added to the system is retained in the system and transferred in an efficient matter to water flowing through the passages. The insulation helps prevent the loss of heat thereby helping to optimize the transfer of heat energy to the water. This reduces the frequency that the PCT heating element 36 has to be energized. This also helps extends the life and maintain the reliability of such components.

In illustrative embodiments, the multi-part 62, 64 structure of the insulating shell 60 and easily removable band 66 helps to quickly and efficiently remove the components with few or no tools for an effective and easy repair. Additionally, the simplicity of this structure also makes reattachment more efficient and more reliable. If the attachment required a more difficult assembly or if the insulating structure 60 becomes damaged the efficiency designed into the system could be reduced. An additional benefit of the insulating structure 60 is to reduce the moisture within the machine. Through condensation and heat transfer, moisture can accumulate within such an apparatus. The highly insulated nature of the system helps reduce the amount of moisture that can develop within the housing 102 thereby providing the added benefits of reduced moisture.

In illustrative embodiments, the upper manifold 18 stabilizes the flow by allowing some amount of water to accumulate when the dispenser 100 is activated and then flow at a generally constant rate through the faucet 104. The upper manifold 18 also allows the water from the multiple quartz heater tubes 22, 24, 26 to accumulate in the reservoir 34 and mix to reduce temperature inconsistencies. The mixing chamber 32 prevents surging of flow and consistency in dispense to prevent "burping" of flow when the faucet 104 is initially opened. In addition, the water heating system 10 is lime tolerant. The mixing chamber 32 of the upper manifold 18 allows the water exiting the heater tubes 22, 24, 26 to combine in a controlled manner to provide consistency in temperature of the water flowing to the reservoir 34. This eliminates the need for flow cores within the heater tubes 22, 24, 26 used in some other systems that can become blocked with the accumulation of lime due to the tight tolerances between the flow core and inner tube wall.

In illustrative embodiments, a reed switch is attached to the interface of the faucet 104 and coupled to the controller 103 to indicate to the controller 103 that water is being dispensed and to activate energizing of the heater tubes 22, 24, 26. The faucet 104 includes a removable and cleanable mesh insert in a nozzle thereof to capture any particulate flowing through the system. In the event a portion of a quartz heater tube 22, 24, 26 is damaged and a particle of the material is entrained in the flow the mesh is sized and dimensioned to trap such a particle and prevent it from flowing out of the faucet 104. An insulting structure is provided around the shank of the faucet 104 to provide insulation to further reduce heat loss through the faucet material and to provide some structural reinforcement against bending loads and fatigue.

In illustrative embodiments, the heater tubes 22, 24, 26 are arranged in parallel to provide less sensitivity to control of the temperature. In this regard, parallel flows of water are each heated to generally the same range of temperature simultaneously. This allows for a relatively increased flow rate while heating smaller portions of water more quickly over a shorter path. This helps provide responsiveness and consistently in the heating of water in the system.

In illustrative embodiments, the equalization chamber 13 provides a buffer volume of water to provide the pump 15 with a reliably consistent source of water to maintain the consistency in the pumping flow to compensate for irregular or unreliable inlet water sources. One of the problems with other water heating systems is that unreliable inlet water sources can starve the pump and result in inconsistent flow rates and relatedly, inconsistent output water temperatures. The buffer volume of water in the equalization chamber 13 also prevents a dry heating scenario in the heater tubes 22, 24, 26 by assuring the pump 15 will not run dry. If the pump 15 runs dry the heater tubes 22, 24, 26 will likewise run dry and could result in terminal heating of the elements requiring replacement of the elements.

In illustrative embodiments, water is pumped by the pump 15 into the parallel quartz heater tubes 22, 24, 26. Water is maintained within the heater tubes and the heater tubes are not allowed to drain. Even though there could be some bleed-back through the pump 15, the check valve 59 prevents flow and drainage of the heater tubes 22, 24, 26. As such, the pump 15 will force water through the parallel oriented heater tubes 22, 24, 26 at the same time the heater tubes 22, 24, 26 are energized to rapidly provide heat energy to the heater tubes 22, 24, 26 and heat the water in the heater tubes 22, 24, 26.

In illustrative embodiments, at the end of a dispensing cycle, water retained in the upper manifold may continue to expand and may need to be vented. A vent line 54 coupled between the upper manifold 18 and the equalization chamber 13 is provided. Water or steam which might accumulate in the upper manifold 18 at the end of a dispense cycle can flow through the line 54 to the equalization chamber 13. The vent line 54 also depressurizes the water heating system 10 to increase control, predictability, and prevent operation the tubular heater tubes 22, 24, 26 under pressure. The water heating system 10 is also "open" by use of vent line 54 so that the heater tubes 22, 24, 26 do not become internally pressurized above a tolerance limit of the quartz heater tubes 22, 24, 26. A level sensor 72 (such as a conductive sensor, a float level sensor, or any other form of level sensor that functions with this system) assures that the volume of water in the equalization chamber 13 is filled to a sufficient level so that the pump 15 has a sufficient volume of water to consistently pump through the system. If the sensor 72 is not indicated to be in a full state while the controller 103 is operating the solenoid valve 11 to the open position the system 10 will shut down to prevent continued dispensing. In this condition, the controller 103 will lock out a dispensing control switch or operation of the pump 15 to prevent continued dispensing. By preventing continued dispensing through the faucet 104 the system does not require any additional water and can be stopped without damage to the heater tubes 22, 24, 26. As noted above, the check valve 59 helps assure that that water will not drain from the instant-response heater assembly 14. This helps assure that the system will not be drained through the dispensing side or drain back through the pump 15 when its operation is terminated.

In illustrative embodiments, the equalization chamber 13 also provides an overflow location in the event the valve 11 is somehow uncontrollably in the open position or water venting from upper manifold 18 fills equalization chamber 13. In the event such an overflow condition occurs, it will drain from the equalization chamber 13 through overflow line 56 into the drip tray 106. This prevents an overflow condition from developing behind the machine or through the counter surface on which the machines is attached or positioned. By flowing from the front of the machine the overflow condition will be readily observed relatively early in the event allowing an operator to manually terminate flow through in the inlet water line 107 through a manual shut off valve positioned elsewhere outside of the heating system or machine 100.

In illustrative embodiments, a temperature sensor 74 is provided at the equalization chamber 13 and communicates with the controller 103. The chamber temperature sensor 74 is provided in the form of a stainless steel NTC, 150 mW that provides the controller 103 with one of the inputs used to control the speed of the water pump 15. The sensor 74 signal provides information that the controller 103 can use to determine the heat carrying capacity of the water in the equalization chamber 13 to help maintain consistent dispensed water temperature. The equalization chamber temperature sensor 74 (as well as the other sensors in the system 10) provide zoned temperature feedback to allow for varying temperatures to be identified and energy provided to the system to be controlled in response to these different temperatures. As an example, if the water inlet temperature sensor 74 detects that the equalization chamber 13 is cooler than expected, the controller 103 will adjust by increasing the energy input to the heater tubes 22, 24, 26 to elevate the temperature to the desired temperature. Whereas if the water temperature on the inlet line 107 is warmer than usual, the controller 103 will use this feedback to manage, likely decreasing, the power input at the heater tubes 22, 24, 26.

In illustrative embodiments, in use, water enters the system through inlet water line 107 and flows through a controllable inlet solenoid 11 which is controlled by the controller 103 in response to a dispense demand at the faucet 104, which may be indicated by a reed switch. The solenoid valve 11 communicates with and controls the flow of inlet water in inlet water line 107 to the equalization chamber 13. Water flowing into the equalization chamber 13 is drawn by pump 15 and delivers the water to a lower manifold 16. The lower manifold 16 is fabricated from a passivated stainless steel, approximately 1.5 mm thick. The pump 15 is controlled and operated to manage the flow to the lower manifold 16 and a check valve 59 is provided upstream of the pump 15, between the equalization chamber 13 and the pump 15, to prevent backflow into the equalization chamber 13 when the pump 15 ceases operation. This check valve 59 is useful to prevent draining of the water down stream of the pump 15 much of which may be at or near dispensing temperature. This check valve 59 is useful since the equalization chamber 13 communicates with and is vented to ambient over vent line 54.

In illustrative embodiments, water flows into a first or lower manifold 16, which then distributes the water to multiple parallel heater tubes 22, 24, 26. The quartz heater tubes heat the water by adding energy as instructed by the controller 103. Heated water flows into an upper manifold 18 for combination from the three tubes and subsequent dispensing through the faucet 104.

In illustrative embodiments, the system includes several feedback sensors to provide feedback to the controller 103 about temperatures in the system so the controller can then regulate the control of heating the water in the system to maintain water dispensed by the system within a relatively controlled range.

In illustrative embodiments, the water heating system 10 balances controls and structure to provide effectively instant, on-demand, extremely consistent temperature hot water at a consistent flow rate, in part by optimizing accuracy and efficiency of control parameters while minimizing energy consumption. The system also minimizes the cost of components, manufacturing and assembly of the unit while meeting reliability, durability, and safety standards. This water heating system 10 effectively works as a hot water engine and can be used with any device that needs a source of hot water. The water heating system 10 could be used in an appliance, brewer, tea maker, powdered beverage maker, sanitizer, or any other form of device currently known or hereafter developed that needs a reliable, consistent temperature hot water, at a generally consistent flow rate.

The following numbered clauses include embodiments that are contemplated and non-limiting:

Clause 1. A water heating system comprising
a water system and a heater assembly.

Clause 2. The water heating system of clause 1, any other clause, or any combination of clauses, wherein the water system includes an equalization chamber configured to store a volume of supply water therein and a pump coupled to the equalization chamber.

Clause 3. The water heating system of clause 2, any other clause, or any combination of clauses, wherein the water system further includes a controllable inlet valve coupled to the equalization chamber and adapted to be coupled with a water inlet line.

Clause 4. The water heating system of clause 1, any other clause, or any combination of clauses, wherein the heater assembly includes:

a plurality of heater tubes configured to controllably heat water flowing through the plurality of heater tubes;

a lower manifold coupled to the plurality of heater tubes, the lower manifold configured to divide a flow of water to pass through individual heater tubes of the plurality of heater tubes; and an upper manifold having a mixing chamber and a reservoir, the mixing chamber coupled to the plurality of heaters and configured to receive heated water from the plurality of heater tubes, the reservoir configured to store a volume of heated water therein for dispensing.

Clause 5. The water heating system of clause 4, any other clause, or any combination of clauses, wherein the lower manifold is coupled to a pump of the water system.

Clause 6. The water heating system of clause 4, any other clause, or any combination of clauses, further comprising a vent line coupled to the upper manifold and the equalization chamber, and wherein the vent line is configured to allow water to flow from the upper manifold to an equalization chamber of the water system.

Clause 7. The water heating system of clause 6, any other clause, or any combination of clauses, further comprising an overflow line coupled to the equalization chamber, and wherein the overflow line is configured to allow water above a predetermined threshold level in the equalization chamber to flow out of the equalization chamber apart from the heater assembly.

Clause 8. The water heating system of clause 4, any other clause, or any combination of clauses, wherein the plurality of heater tubes are arranged in parallel to one another such that water flows through each heater tube separately from another heater tube from the lower manifold to the upper manifold.

Clause 9. The water heating system of clause 8, any other clause, or any combination of clauses, wherein the plurality of heater tubes includes three individual heater tubes.

Clause 10. The water heating system of clause 9, any other clause, or any combination of clauses, wherein each heater tube of the plurality of heater tubes is a metal coated quartz heater tube.

Clause 11. The water heating system of clause 4, any other clause, or any combination of clauses, further comprising a controller configured to operate an inlet valve and a pump of the water system and the plurality of heater tubes to maintain at least a predetermined volume of heated water in the upper manifold.

Clause 12. The water heating system of clause 11, any other clause, or any combination of clauses, further comprising a heater coupled to the upper manifold configured to maintain the volume of water in the upper manifold above a predetermined temperature.

Clause 13. The water heating system of clause 12, any other clause, or any combination of clauses, further comprising insulation surrounding the upper manifold.

Clause 14. The water heating system of clause 4, any other clause, or any combination of clauses, further comprising a first set of flexible connectors coupled between the plurality of heater tubes and the lower manifold and a second set of flexible connectors coupled between the plurality of heater tubes and the upper manifold, wherein the first and second sets of flexible connectors are configured to allow movement of the heater tubes relative to the lower and upper manifolds.

Clause 15. A hot water dispenser comprising
a housing;
a water heating system received in the housing; and
a faucet coupled to water heating system and extending outside of the housing, the faucet configured to controllably dispense hot water at the selection of a user.

Clause 16. The water heating system of clause 15, any other clause, or any combination of clauses, further comprising a frame, and wherein the housing is coupled to the frame and the water heating system is coupled to the frame.

Clause 17. The water heating system of clause 15, any other clause, or any combination of clauses, wherein the water system includes an equalization chamber configured to store a volume of supply water therein and a pump coupled to the equalization chamber.

Clause 18. The water heating system of clause 17, any other clause, or any combination of clauses, wherein the water system further includes a controllable inlet valve coupled to the equalization chamber and adapted to be coupled with a water inlet line.

Clause 19. The water heating system of clause 15, any other clause, or any combination of clauses, wherein the heater assembly includes:

a plurality of heater tubes configured to controllably heat water flowing through the plurality of heater tubes;

a lower manifold coupled to the plurality of heater tubes, the lower manifold configured to divide a flow of water to pass through individual heater tubes of the plurality of heater tubes; and an upper manifold having a mixing chamber and a reservoir, the mixing chamber coupled to the plurality of heaters and configured to receive heated water from the plurality of heater tubes, the reservoir configured to store a volume of heated water therein for dispensing.

Clause 20. The water heating system of clause 19, any other clause, or any combination of clauses, further comprising a drip tray coupled to the housing.

Clause 21. The water heating system of clause 20, any other clause, or any combination of clauses, wherein the faucet is position over the drip tray.

Clause 22. The water heating system of clause 19, any other clause, or any combination of clauses, wherein the lower manifold is coupled to a pump of the water system.

Clause 23. The water heating system of clause 19, any other clause, or any combination of clauses, further comprising a vent line coupled to the upper manifold and the equalization chamber, and wherein the vent line is configured to allow water to flow from the upper manifold to an equalization chamber of the water system.

Clause 24. The water heating system of clause 23, any other clause, or any combination of clauses, further comprising an overflow line coupled to the equalization chamber, and wherein the overflow line is configured to allow water above a predetermined threshold level in the equalization chamber to flow out of the equalization chamber to a drip tray.

Clause 25. The water heating system of clause 19, any other clause, or any combination of clauses, wherein the plurality of heater tubes are arranged in parallel to one another such that water flows through each heater tube separately from another heater tube from the lower manifold to the upper manifold.

Clause 26. The water heating system of clause 25, any other clause, or any combination of clauses, wherein the plurality of heater tubes includes three individual heater tubes.

Clause 27. The water heating system of clause 26, any other clause, or any combination of clauses, wherein each heater tube of the plurality of heater tubes is a metal coated quartz heater tube.

Clause 28. The water heating system of clause 19, any other clause, or any combination of clauses, further comprising a controller configured to operate an inlet valve and a pump of the water system and the plurality of heater tubes to maintain at least a predetermined volume of heated water in the upper manifold.

Clause 29. The water heating system of clause 28, any other clause, or any combination of clauses, further comprising a heater coupled to the upper manifold configured to maintain the volume of water in the upper manifold above a predetermined temperature.

Clause 30. The water heating system of clause 29, any other clause, or any combination of clauses, further comprising insulation surrounding the upper manifold.

Clause 31. The water heating system of clause 19, any other clause, or any combination of clauses, further comprising a first set of flexible connectors coupled between the plurality of heater tubes and the lower manifold and a second set of flexible connectors coupled between the plurality of heater tubes and the upper manifold, wherein the first and second sets of flexible connectors are configured to allow movement of the heater tubes relative to the lower and upper manifolds.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

What is claimed is:

1. A water heating system comprising:
   a water system including:
     a controllable inlet valve adapted to be coupled with a water inlet line;
     an equalization chamber coupled to the inlet valve and configured to store a volume of supply water therein; and
     a pump coupled to the equalization chamber; and
   a heater assembly including:
     a plurality of heater tubes configured to controllably heat water flowing through the plurality of heater tubes;
     a lower manifold coupled to the pump and to the plurality of heater tubes, the lower manifold configured to divide a flow of water supplied by the pump to pass through individual heater tubes of the plurality of heater tubes; and
     an upper manifold having a mixing chamber and a reservoir, the mixing chamber coupled to the plurality of heaters and configured to receive heated water from the plurality of heater tubes, the reservoir configured to store a volume of heated water therein for dispensing.

2. The water heating system of claim 1, further comprising a vent line coupled to the upper manifold and the equalization chamber, and wherein the vent line is configured to allow water to flow from the upper manifold to the equalization chamber.

3. The water heating system of claim 2, further comprising an overflow line coupled to the equalization chamber, and wherein the overflow line is configured to allow water above a predetermined threshold level in the equalization chamber to flow out of the equalization chamber apart from the heater assembly.

4. The water heating system of claim 1, wherein the plurality of heater tubes are arranged in parallel to one another such that water flows through each heater tube separately from another heater tube from the lower manifold to the upper manifold.

5. The water heating system of claim 4, wherein the plurality of heater tubes includes three individual heater tubes.

6. The water heating system of claim 5, wherein each heater tube of the plurality of heater tubes is a metal coated quartz heater tube.

7. The water heating system of claim 1, further comprising a controller configured to operate the inlet valve, the pump, and the plurality of heater tubes to maintain at least a predetermined volume of heated water in the upper manifold.

8. The water heating system of claim 7, further comprising a heater coupled to the upper manifold configured to maintain the volume of water in the upper manifold above a predetermined temperature.

9. The water heating system of claim 8, further comprising insulation surrounding the upper manifold.

10. The water heating system of claim 1, further comprising a first set of flexible connectors coupled between the plurality of heater tubes and the lower manifold and a second set of flexible connectors coupled between the plurality of heater tubes and the upper manifold, wherein the first and second sets of flexible connectors are configured to allow movement of the heater tubes relative to the lower and upper manifolds.

11. A hot water dispenser comprising:
a frame;
a housing coupled to the frame;
a drip tray coupled to the housing;
a water heating system received in the housing and coupled to the frame, the water heating system comprising:
a water system including:
a controllable inlet valve adapted to be coupled with a water inlet line;
an equalization chamber coupled to the inlet valve and configured to store a volume of supply water therein; and
a pump coupled to the equalization chamber; and
a heater assembly including:
a plurality of heater tubes configured to controllably heat water flowing through the plurality of heater tubes;
a lower manifold coupled to the pump and to the plurality of heater tubes, the lower manifold configured to divide a flow of water supplied by the pump to pass through individual heater tubes of the plurality of heater tubes; and
an upper manifold having a mixing chamber and a reservoir, the mixing chamber coupled to the plurality of heaters and configured to receive heated water from the plurality of heater tubes, the reservoir configured to store a volume of heated water therein for dispensing; and
a faucet coupled to the upper manifold and extending outside of the housing over the drip tray, the faucet configured to controllably dispense hot water at the selection of a user.

12. The hot water dispenser of claim 11, further comprising a vent line coupled to the upper manifold and the equalization chamber, and wherein the vent line is configured to allow water to flow from the upper manifold to the equalization chamber.

13. The hot water dispenser of claim 12, further comprising an overflow line coupled to the equalization chamber, and wherein the overflow line is configured to allow water above a predetermined threshold level in the equalization chamber to flow out of the equalization chamber to the drip tray.

14. The hot water dispenser of claim 11, wherein the plurality of heater tubes are arranged in parallel to one another such that water flows through each heater tube separately from another heater tube from the lower manifold to the upper manifold.

15. The hot water dispenser of claim 14, wherein the plurality of heater tubes includes three individual heater tubes.

16. The hot water dispenser of claim 15, wherein each heater tube of the plurality of heater tubes is a metal coated quartz heater tube.

17. The hot water dispenser of claim 11, further comprising a controller configured to operate the inlet valve, the pump, and the plurality of heater tubes to maintain at least a predetermined volume of heated water in the upper manifold.

18. The hot water dispenser of claim 17, further comprising a heater coupled to the upper manifold configured to maintain the volume of water in the upper manifold above a predetermined temperature.

19. The hot water dispenser of claim 18, further comprising insulation surrounding the upper manifold.

20. The hot water dispenser of claim 11, further comprising a first set of flexible connectors coupled between the plurality of heater tubes and the lower manifold and a second set of flexible connectors coupled between the plurality of heater tubes and the upper manifold, wherein the first and second sets of flexible connectors are configured to allow movement of the heater tubes relative to the lower and upper manifolds.

* * * * *